Patented June 20, 1950

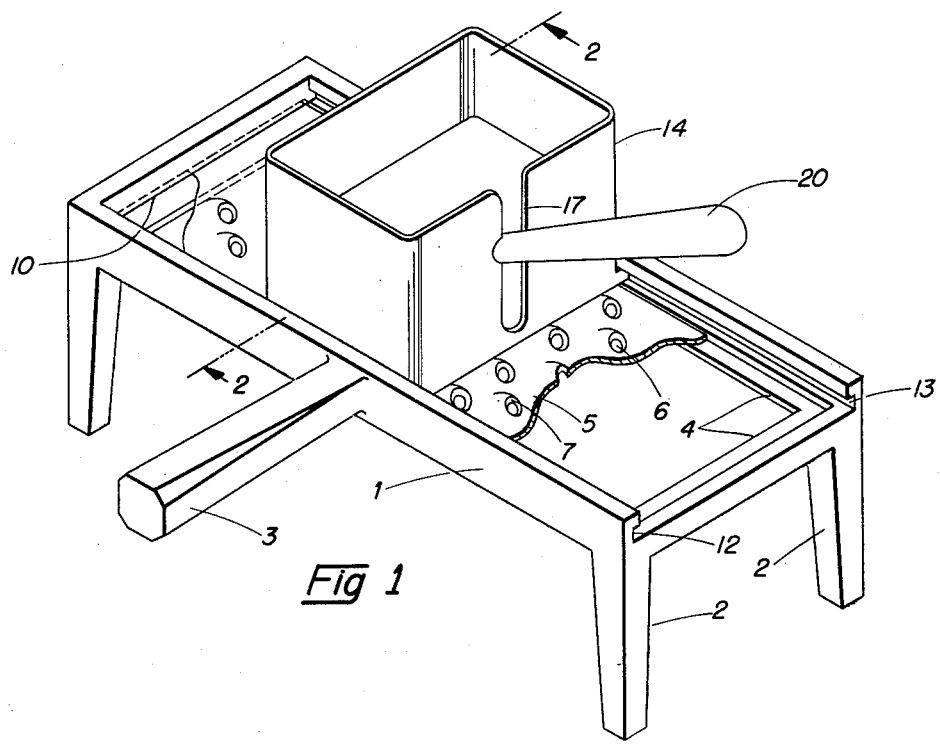
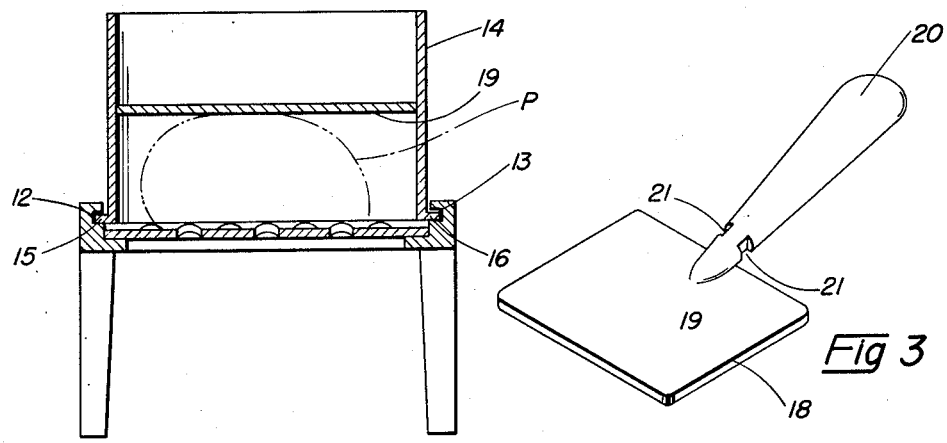

2,511,909

UNITED STATES PATENT OFFICE 2,511,909

CULINARY UTENSIL

Max Forman, Atlantic City, N. J.

Application April 26, 1949, Serial No. 89,608

4 Claims. (Cl. 146—179)

This invention relates to a household kitchen utensil for reducing an article of food or the like to relatively small pieces which operation, be it shredding, slicing, grating or other generally analogous one I generically designate as "comminuting," and is especially directed to an improved utensil of this character in which the article is fed to a comminuting element substantially automatically while being manually reciprocated relatively thereto.

The utensil may be adapted for performance upon an article of foodstuff or substantially any operation which requires reciprocatory motion of the article relatively to a comminuting element combined with pressure in a direction transverse to the plane of its said motion and the utensil thus may be used for shredding cabbage, lettuce and other leafy vegetables; for slicing, dicing or slivering potatoes, carrots, beets and like root vegetables; for grating cheese, nutmegs and other relatively hard and dry foods and condiments; for slicing eggs, tomatoes, onions and similar articles and in general for practically any of the numerous generally like operations known to the culinary art.

It is thus a principal object of the invention to provide a novel and a convenient utensil for comminuting foodstuffs in which feed of the articles to be comminuted is effected substantially automatically in the operation of reciprocating it in relation to the comminuting element which directly effects the shredding.

A further object is the provision of a utensil of this character in which the comminuting elements can be quickly interchanged in accordance with the particular results desired.

Another object is to provide such a utensil which is mechanically simple in its construction and operation, consists of but few working parts which may be readily disassembled for cleaning or for interchange of comminuting elements yet which is durable, easily manipulated and devoid of parts which may readily be broken or damaged in normal use.

Other objects, purposes and advantages of the invention will hereinafter more fully appear or be understood from the following description of a preferred embodiment of it as illustrated in the accompanying drawing in which:

Fig. 1 is a perspective view of the utensil, with parts broken away to better illustrate its construction.

Fig. 2 is a vertical section on line 2—2 in Fig. 1 and

Fig. 3 is a perspective view of the manually operated reciprocating and feeding element removed from the utensil.

More particularly the said utensil comprises a generally rectangular open frame 1, which preferably is formed in one piece by die casting a suitable aluminum alloy or other material, having integral supporting legs 2 at its corners and an outwardly projecting stabilizing handle 3 substantially centrally of one of its longer sides and also desirably integral with the frame. Additionally, the frame includes an inwardly projecting rib forming a narrow ledge or shelf 4 below its upper edge for supporting the removable comminuting element or comminuter 5, which as shown consists of a metal plate having formed in it in staggered rows a plurality of spaced holes 6 adjacent each of which the metal is deformed upwardly to provide above each hole a curved cutting edge 7 preferably ground to impart the keenness requisite for cutting the article presented to it into a sliver for discharge through the hole 6 and thence below the plate as the article is reciprocated over the upper surface of the latter by means hereafter to be described.

The frame at one end is provided with a transverse groove 10 having its bottom aligned with the upper surface of the ledge 4 and adapted to receive an end of the comminuter 5 which is preferably so proportioned that when such one end is bottomed in the groove its other end abuts the opposite end of the frame above the ledge and its side edges rest on the latter snugly within the frame whereby the comminuter is securely held within the frame against lateral motion in any direction but may easily be removed by lifting its free end and then disengaging its other end from the groove.

In each side of the frame just above the ledge 4 is an inwardly opening groove, these grooves 12, 13 providing ways for a substantially rectangular open hopper 14 adapted to fit slidably between the sides of the frame and having outwardly directed tongues 15, 16 adjacent its bottom edge for engagement in the said grooves. The hopper also is provided with a vertical slot 17 in one of those of its walls which extend parallel to the ends of the frame when the tongues are entered in the slots, this slot 17 extending downwardly from the upper edge of the hopper and being adapted for reception of a feeder 18, illustrated apart from the hopper in Fig. 3.

This feeder comprises a rigid flat blade 19 generally conforming in shape to but of slightly smaller size than the interior of the hopper and preferably integral with the blade an angularly outwardly projecting handle 20 having opposed slots 21 adjacent its juncture with the blade extending normal to the plane thereof. These slots receive and cooperate with the hopper wall when the handle is entered in slot 17 and so maintain the blade 19 substantially parallel to the comminuter 5 as the hopper is reciprocated in its ways whereby an article of food such as a potato P in the hopper, indicated in broken lines in Fig. 2, may be moved back and forth over the comminuter by the hopper walls and simultaneously pressed down against its cutting edges by the blade 19 when the plate 20 is grasped in one hand and suitably manipulated, the other hand thus being free to steady the utensil with the aid of frame handle 3.

The slot 17 terminates a little short of the lower edge of the hopper, preferably at a point just sufficient to allow the blade 19 to descend in the hopper to a plane spaced above the plane of comminuter 5 about 1/8" more or less, whereby the article being shredded may be continuously fed to the cutting edges 7 during reciprocation of the hopper until but relatively a thin slice of it or none at all remains.

After use the hopper 14 may readily be slid out of its ways, the feeder 18 out of slot 17 and the comminuter 5 removed from the frame as already described to facilitate washing, and as none of them offers pockets, interstices or the like in which food particles might lodge or become difficult of removal they can be cleansed very easily.

Of course any number of comminuters may be provided each respectively designed to produce a desired result be it shredding, grating, cutting or other kind of comminution, for as long as they are all of the same size they may be readily interchanged in the frame at the option of the user of the utensil. Thus one may be of the character already described; another may embody but a single angular cutting edge adapted to reduce an onion or analogous vegetable to slices of predetermined thickness; another a series of spaced, tightly stretched longitudinally extending wires and so especially adapted for slicing hard boiled eggs and the like; still another a plate having relatively fine grater teeth for grating such articles as cheese and nutmeg; while elements having serrated or otherwise specially formed edges may also be furnished for cutting foodstuffs into fancy slices or strips. It will thus be appreciated that the comminuter may be provided with "teeth," to use a comprehensive term, of any desired form or type since their specific configuration or character form no part of the invention.

While I have herein shown and particularly described a preferred embodiment of the latter it will be understood I do not thereby desire or intend or limit or confine myself specifically thereto as changes and modifications in the form, construction arrangement and relationship to each other of the several parts and elements and in their mode of operation will readily occur to those skilled in the art, and may be made if desired without departing from the spirit or scope of the invention as defined in the appended claims.

Having thus described my invention, I claim and desire to protect by Letters Patent of the United States:

1. A culinary utensil comprising an elongated substantially rectangular frame, a hopper open at its top and bottom adapted to be supported on the frame for reciprocation longitudinally thereof, a plate-like comminuting element on the frame beneath the path of said hopper, said hopper having a vertical slot in a side wall thereof that extends transversely of the direction of reciprocation, said slot extending downwardly from the upper edge of said wall intermediate the sides of the frame, and a feeder having a blade substantially conforming to the interior of the hopper movable vertically therein, and a handle fixedly secured to said feeder blade at the upper side thereof and projecting outwardly longitudinally therefrom through said slot, said handle being provided with slots at opposite sides thereof proximate its juncture with the blade to receive opposite side edge portions of the wall of the hopper bounding said slot, said slotted portions of the handle cooperating with the hopper wall to maintain the feeder blade substantially parallel to the plate-like comminuting element, said handle providing means whereby the hopper may be reciprocated longitudinally and the feeder blade simultaneously pressed downwardly therein.

2. A culinary utensil comprising an elongated substantially rectangular frame, a hopper open at its top and bottom adapted to be supported on the frame for reciprocation longitudinally thereof, a plate-like comminuting element on the frame beneath the path of said hopper, said hopper having a vertical slot in a side wall thereof that extends transversely of the direction of reciprocation, said slot extending downwardly from the upper edge of said wall intermediate the sides of the frame, and a feeder having a blade substantially conforming to the interior of the hopper movable vertically therein, and a handle fixedly secured to said feeder blade at the upper side thereof and projecting outwardly longitudinally therefrom through said slot, said handle being provided with slots at opposite sides thereof proximate its juncture with the blade, said slots extending normal to the plane of the blade to receive opposite side edge portions of the wall of the hopper bounding said slot, said slotted portions of the handle cooperating with the hopper wall to maintain the feeder blade substantially parallel to the plate-like comminuting element, said handle providing means whereby the hopper may be reciprocated longitudinally and the feeder blade simultaneously pressed downwardly therein.

3. A culinary utensil comprising an elongated substantially rectangular frame, a hopper open at its top and bottom adapted to be supported on the frame for reciprocation longitudinally thereof, a plate-like comminuting element on the frame beneath the path of said hopper, said hopper having a vertical slot in a side wall thereof that extends transversely of the direction of reciprocation, said slot extending downwardly from the upper edge of said wall intermediate the sides of the frame, and a feeder having a blade substantially conforming to the interior of the hopper movable vertically therein, and a handle fixedly secured to said feeder blade at the upper side thereof and projecting outwardly longitudinally at an upward inclination therefrom through said slot, said handle being provided with slots at opposite sides thereof proximate its juncture with the blade, said slots extending normal to the plane of the blade to receive opposite side edge portions of the wall of the hopper bounding said slot, said slotted portions of the handle cooperating with the hopper wall to maintain the feeder blade substantially parallel to the plate-like comminuting element, said handle providing means whereby the hopper may be reciprocated longitudinally and the feeder blade simultaneously pressed downwardly therein.

4. A culinary utensil comprising a rectangular open frame having an inwardly directed ledge extending about the inner side thereof at its lower part and a transversely extending groove at one end having its bottom wall aligned with the upper surface of said ledge, a plate-like comminuting element removably seated on the ledge with one end portion fitting into said groove and with its other end abutting against the other end of the frame above said ledge, said frame having oppositely disposed longitudinal inwardly opening grooves in opposite sides of the same above said comminuted element, a hopper open at its top and bottom adapted to be disposed between the sides of the frame for reciprocation longitudinally, said hopper having longitudinally extending outwardly directed tongues at opposite sides thereof adjacent its lower edge engageable in said longitudinal grooves, and said hopper having a vertical slot in a side wall thereof that extends transversely of the direction of reciprocation, said slot extending downwardly from the upper edge of said wall intermediate the sides of the frame, and a feeder having a blade substantially conforming to the interior of the hopper movable vertically therein, and a handle fixedly secured to said feeder blade at the upper side thereof and projecting outwardly longitudinally therefrom through said slot, said handle being provided with slots at opposite sides thereof proximate its juncture with the blade to receive opposite side edge portions of the wall of the hopper bounding said slot, said slotted portions of the handle cooperating with the hopper wall to maintain the feeder blade substantially parallel to the plate-like comminuting element, said handle providing means whereby the hopper may be reciprocated longitudinally and the feeder blade simultaneously pressed downwardly therein.

MAX FORMAN.

REFERENCES CITED

The following references are of record in the file of this patent:

UNITED STATES PATENTS

| Number | Name | Date |
|---|---|---|
| 113,188 | Monnet | Mar. 28, 1871 |
| 225,313 | Wittenmeier | Mar. 9, 1880 |
| 340,884 | Kirk | Apr. 27, 1886 |
| 446,167 | Kyle | Feb. 10, 1891 |